SIGNAL-SEEKING DEVICE

Filed Nov. 10, 1954 3 Sheets-Sheet 1

Inventor:
Joseph E. Laschenski
by Howson & Howson
Attys.

Dec. 16, 1958 J. E. LASCHENSKI 2,864,957

SIGNAL-SEEKING DEVICE

Filed Nov. 10, 1954 3 Sheets-Sheet 2

Inventor:
Joseph E. Laschenski
by Howson & Howson
Attys.

Dec. 16, 1958 J. E. LASCHENSKI 2,864,957

SIGNAL-SEEKING DEVICE

Filed Nov. 10, 1954 3 Sheets-Sheet 3

Inventor:
Joseph E. Laschenski
by Howson & Howson
Attys.

United States Patent Office 2,864,957
Patented Dec. 16, 1958

2,864,957

SIGNAL-SEEKING DEVICE

Joseph E. Laschenski, Philadelphia, Pa., assignor to Philco Corporation, Philadelphia, Pa., a corporation of Pennsylvania Application November 10, 1954, Serial No. 468,008

10 Claims. (Cl. 250—40)

This invention relates to signal receivers of the signal-seeking type which function, in response to successive initiations on the part of the user, to tune themselves automatically and successively to receivable signals within the reception range. Radio receivers of this type are particularly useful in vehicles, such as automobiles, as they require a minimum amount of attention on the part of the operator. Thus with such a radio receiver, the operator may simply push a button, and the receiver will then automatically tune itself to the next receivable signal, e. g., the next higher frequency signal, in the reception range or band. If the operator again wishes to change the tuning, he again pushes the starting button and the receiver proceeds to tune itself to the next receivable signal.

Various types and forms of signal-seeking receivers have been proposed. For the purpose of this specification, such a receiver is to be regarded broadly as one having means for effecting automatic tuning in response to some starting operation on the part of the operator, and having means responsive to incoming signals for stopping the tuning operation when a receivable signal is tuned in.

In a signal-seeking receiver, it is usually desirable to provide for over-all signal-seeking operation, i. e. signal-seeking operation which progresses through the entire reception range or band from one end of the band to the other. However, it is also desirable to provide for limited signal-seeking operation over selected portions of the reception band. Thus, with respect to broadcasting stations to which the user of a radio receiver customarily listens, it is desirable to provide for push-button selection of signals in the respective portions of the reception band in which the transmitting frequencies of such stations are located. By providing selective limited signal-seeking in response to selective operation of the push-buttons, the tuning operation is greatly simplified and the effort on the part of the operator is minimized.

One object of the present invention is to provide a signal-seeking receiver having provision for limited signal-seeking over a predetermined portion of the reception range or band.

Another object of the invention is to provide such a receiver having provision for selective limited signal-seeking over predetermined portions of the reception range.

A further object of the invention is to provide a signal-seeking receiver having provision both for over-all signal-seeking and for selective limited signal-seeking at the will of the operator.

A further object of the invention is to provide an arrangement for selective limited signal-seeking which is simple in construction and is economical to construct, and which is easy to adjust and is substantially immune to accidental change of setting of the elements which determine the signal-seeking ranges.

A still further object of the invention is to provide an arrangement for selective limited signal-seeking wherein the various frequency-selective means are mechanically and electrically independent of one another.

In accordance with the present invention, there is provided a signal receiver comprising means for tuning the receiver to signals having frequencies within a predetermined frequency range, means responsive to a tuned-in signal for stopping the tuning, and means for restricting operation of said stopping means to the tuning in of a signal having a frequency within a portion of said range, said restricting means including at least two pairs of switches arranged so that either switch pair may restrict operation of the stopping means, one switch of each pair being actuable by said first means, and the other switch of each pair being arranged to render the first switch either effective or ineffective.

The invention may be clearly understood from the following detailed description with reference to the accompanying drawings, wherein Fig. 1 is a diagrammatic illustration of the electrical system of a signal receiver embodying the present invention;

It is believed that the present invention may best be understood by considering first the electrical system and the general operation of the receiver, and then the mechanical structure of the tuning mechanism employed.

Figures 1, 2:
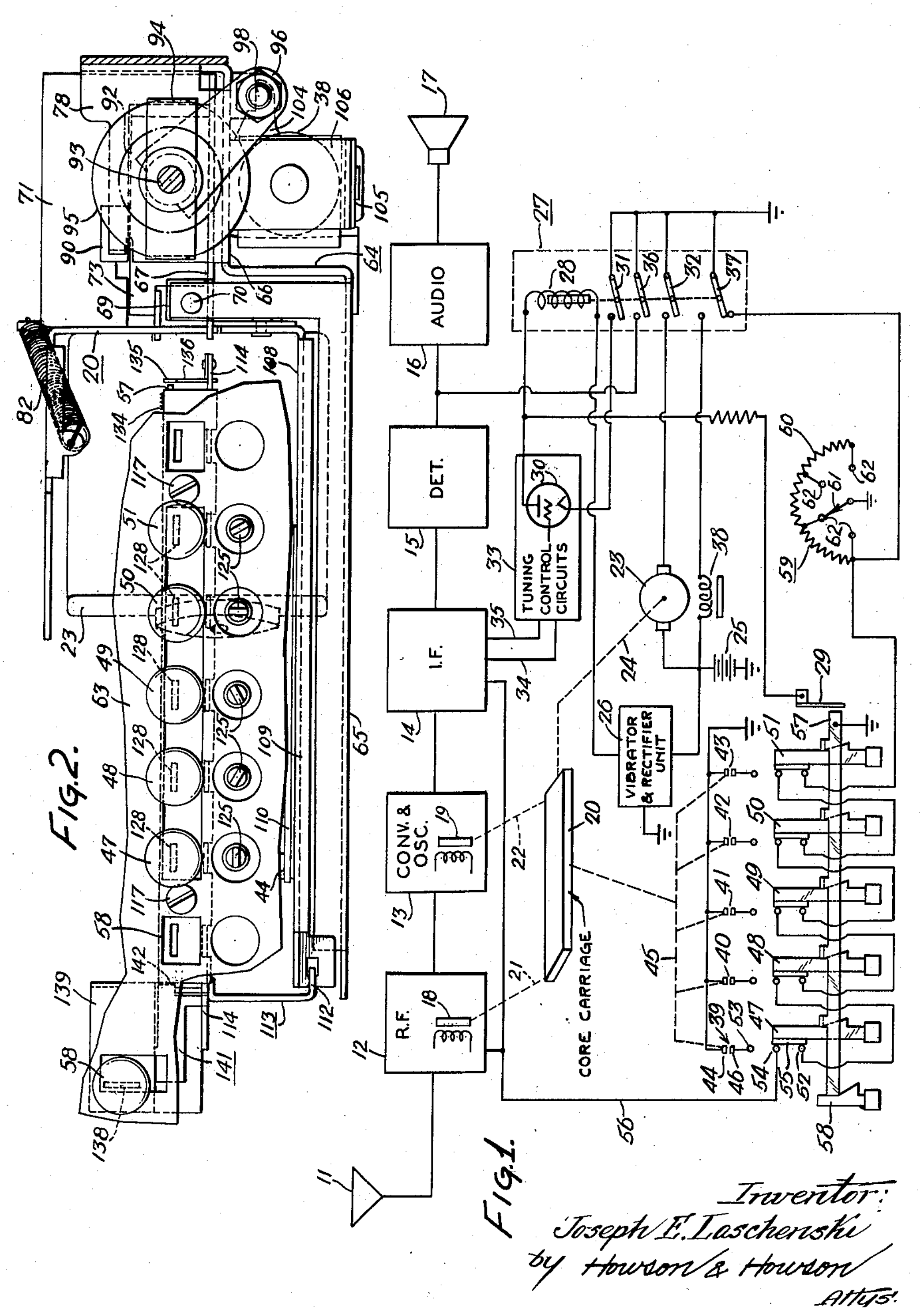
Fig. 2 is a front view of the tuning mechanism, with the front panel broken away to show the parts.

The system of the invention may comprise a conventional signal receiver, which, in the embodiment depicted in Figure 1, is a superheterodyne radio receiver. Such a receiver may comprise an antenna 11, one or more R. F. amplifier stages 12, a converter and oscillator stage 13, one or more I. F. amplifier stages 14, a detector 15, one or more audio amplifier stages 16, and a sound reproducer or loud-speaker 17. Tuning of the receiver preferably is effected by movement of adjustable cores according to the well-known permeability tuning method, two such cores being represented at 18 and 19. As hereinafter more particularly described, the cores are moved by means of a carriage 20, represented in simple form in Fig. 1, to which the movable cores are connected as indicated by the dashed lines 21 and 22. The carriage 20 is preferably actuated by means of an electric motor 23, the driving connection between the motor and the carriage being represented by the dashed line 24.

While the invention is broadly applicable to signal receivers, it may be assumed that the radio receiver shown in Fig. 1 is to be used on a vehicle, such as an automobile, and therefore the usual vehicle battery is represented at 25, and the usual vibrator and rectifier unit is represented in block form at 26. It will be understood that the battery 25 and the unit 26 supply the operating voltages to the receiver components shown in block form. For simplicity, the connections for supplying such voltages have been omitted.

The driving motor 23 is controlled by a relay 27 whose winding 28 is energized from unit 26 by momentary closure of a switch 29. The relay winding 28 has one terminal connected to the anode of a control tube 30 and the other terminal connected to the positive high voltage supply of the rectifier unit 26. In addition, the terminal of winding 28 which is connected to the anode of tube 30 is also connected through a current-limiting resistor to one terminal of single-pole single-throw switch 29, the other terminal of which is connected to a point at ground potential. When switch 29 is momentarily closed, relay 27 is energized, thereby connecting the cathode of control tube 30 to a point at ground potential through relay contact 31. As a result, a heavy cathode-anode current flows through control tube 30 and maintains energization of relay 27 independently of switch 29. Through its contact 32, the relay effects energization of the motor 23 which is in circuit with the battery 25. Through contact 37, in its upper position, the relay energizes a solenoid 38 which serves, as hereinafter described, to decouple a manual tuning knob and to couple the driving motor for automatic tuning. For simplicity, the manual tuning knob and the clutch are not shown in Fig. 1 which is intended only to show the electrical connections. Through contact 36, the relay mutes the radio receiver by short-circuiting the input to the audio stages.

The motor 23 drives the carriage 20 in one direction to tune the receiver to the next receivable signal. When such a signal is tuned in, the tube 30 is rendered non-conductive to deenergize the relay winding 28 thereby to deenergize the motor 23. The opening of relay contact 31 opens the cathode circuit of tube 30 and thus renders the tube inoperative until such time as the relay is again energized by closure of switch 29.

It is well known in the art to effect cut-off of a control tube in response to a tuned-in signal, and any of the known arrangements may be employed to cut off the control tube 30. Preferably, however, the control arrangement is of the character disclosed and claimed in the copending application of Ralph Bray, Serial No. 459,043, filed September 29, 1954, and is represented by the rectangle 33. In such a system, two signals are derived from the I. F. portion of the receiver via conductors 34 and 35 and are applied to a phase detector, the output of which is coupled to the control grid of the control tube through a differentiating circuit.

As thus far described, the receiver comprises means for tuning in signals having frequencies within a predetermined frequency range, e. g., the broadcast band, and means for stopping the tuning operation when a signal is tuned in. In accordance with the present invention, provision is made for limited signal-seeking operation, as hereinbefore mentioned, under control of at least two pairs of switches, one switch of each pair being actuated by the tuning means, and the other switch of each pair serving to render the first switch effective or ineffective. The stopping of the tuning operation is made to depend, not only upon the reception of a signal, but also upon the conditioning of circuit means under control of the pairs of switches. While any suitable arrangement for accomplishing this objective may be employed, that illustrated and now to be described is preferred. In the illustrated system, there are five pairs of switches for the above-stated purpose, but it will be understood that this number of switch pairs is arbitrarily chosen.

In the illustrated embodiment, there are five switches numbered 39 to 43, each of which comprises a movable contact 44 (see also Figs. 6 to 8) which is actuated by the carriage 20 as indicated by the dashed lines 45, and a stationary contact 46 which is pre-set so as to effect closure of the various switches in different portions of the operating range of the carriage corresponding to different portions of the reception band. In the illustrated system, the contact 44 of each of the switches 39 to 43 is grounded, but this is only because of the way in which the switches are made to serve the desired purpose as hereinafter described. Associated with the switches 39 to 43 are push-button switches 47 to 51 which are normally in the front position as shown but are selectively movable to a back position. Each of the push-button switches comprises a front contact 52, a back contact 53, an intermediate contact 54, and a movable bridging contact 55 which engages the intermediate contact 54 in both positions of the switch. The back contacts 53 of the push-button switches are connected respectively to the stationary contacts 46 of the switches 39 to 43. Actuation of any one of the push-button switches causes the movable contact element 55 to leave the front contact 52 and to engage the back contact 53.

The above-described switches serve to effect selective limited signal-seeking through control of circuit means adapted to control operation of the means for stopping the tuning operation. Preferably such circuit means is the cathode-to-ground connection for one or more of the high frequency stages of the receiver. Thus, in the illustrated embodiment, the circuit conductor 56 is connected to the cathodes of the tubes in the R. F. and I. F. stages, and this conductor extends to the contact 54 of the extreme left-hand push-button switch 47, which contact is a terminal to which ground potential must be applied as a condition precedent to stoppage of the tuning operation. It will also be noted that the front and intermediate contacts of adjacent push-button switches are interconnected. It will be seen, therefore, that movement of any one of the push-button switches to its back position will effect connection of the conductor 56 to the corresponding one of the switches 39 to 43. As in the case of the conventional push-button mechanism, a latch bar 57 (see also Figs. 3 and 6) serves to hold any one of the push-button switches in its back position, releasing any previously actuated switch. Therefore, the conductor 56 can be connected to only one of the switches 39 to 43 at one time, so that only one of said switches can be effective to apply ground potential to said conductor.

With the arrangement shown, if the push-button switches are all left in their front positions as shown and switch 29 is actuated, the tuning system will operate to effect over-all signal-seeking action from one end to the other of the reception band. This is due to the fact that the conductor 56 is connected to ground (through device 59) independently of switches 39 to 43 which are ineffective. However, actuation of any one of the push-button switches 47 to 51 will cause the tuning system to effect selective limited signal-seeking action over the selected portion of the reception band, because the conductor 56 will then be connected to ground only as controlled by one of the switches 39 to 43.

To initiate operation of the system, the switch 29 need only be closed momentarily. In the preferred embodiment illustrated, this switch is momentarily actuated by the latch bar 57 which shifts momentarily toward the right, as in conventional push-button arrangements, each time one of the push-buttons is depressed. For over-all signal-seeking operation, an additional push-button 58 is provided which serves simply to shift the latch bar momentarily to effect momentary closure of switch 29.

In signal-seeking receivers, it is generally desirable to provide for decreased sensitivity of the receiver during overall signal-seeking operation. The purpose of this is to insure that the tuning will be stopped only in response to a signal of adequate strength for satisfactory operation of the receiver. Therefore, in the illustrated system, there is preferably provided a sensitivity control device 59 which may comprise a tapped resistor 60 and a multi-position switch having a grounded movable contact 62 and stationary contacts 62. This device is connected as shown to the front contact of push-button switch 51 and to the normally-closed stationary contact of relay 27. When the relay is deenergized, the device 59 is rendered ineffective as the conductor 56 is connected to ground independently of the device 59 through relay contact 37. However, when the relay 27 is energized, the ground connection for conductor 56 through contact 37 is opened, and the conductor 56 is connected to ground through the switch arm 61. With this switch arm in its extreme left-hand position, the receiver sensitivity is not reduced, but with the switch arm in other positions, the receiver sensitivity is reduced according to the amount of included resistance.

Reference is now made to Figs. 2 to 10, which show the preferred form of the mechanical tuning mechanism employed in the receiver diagrammatically illustrated in Fig. 1. As shown particularly in Figs. 2 to 6, the structure comprises a front panel 63 to which a supporting frame, designated generally by reference numeral 64, is attached. The base member 65 (Fig. 2) of the supporting frame has a portion 66 which serves to support the motor drive mechanism by which the tuning operation is effected. While many suitable drive mechanisms may be employed, that illustrated is preferred.

As described above in connection with the diagrammatic illustration in Fig. 1, tuning movement of the movable cores is effected by means of a movable carriage structure designated generally by reference numeral 20. This carriage structure (see Fig. 3) comprises a base member 67 having turned-up apertured ears 68 and 69 through which a fixed guide rod 70 extends for the purpose of guiding the movement of the carriage. The ends of the rod 70 are secured to portions of the fixed supporting frame. Secured to the base member of the carriage structure is an up-standing plate 71 on which the movable tuning cores (not shown) are mounted. Pivotally secured to the base member 67 at 72, and overlying said base member, is a second carriage member 73 (see also Fig. 4), which rotatably supports two gears 74 and 75 that mesh with a screw shaft 76. The reason for the pivot 72 is to compensate for possible irregularities of the screw shaft 76 from true linearity. This shaft is rotatably supported by vertical wall portions 77 and 78 of the stationary frame. During signal-seeking tuning operation, the drive motor 23 is coupled to the screw shaft 76 through clutch elements 79 and 80 and drives the shaft through reduction gearing 81. The motor operates in one direction only to drive the screw shaft 76 clockwise as viewed from the front, and by reason of the arrangement now to be described the carriage 20 is moved forwardly by rotation of the screw shaft 76 to effect tuning throughout the reception band. When the movable carriage reaches the forward end of its travel, it is abruptly returned to its starting position by a large tension spring 82 whose forward end is secured to the carriage structure and whose rearward end is secured to a portion of the fixed frame.

Affixed to the gear 74 (see Fig. 3) is a locking plate 83 which has two oppositely positioned recesses or notches 84 and 85. A locking lever 86 is pivotally mounted at 87 on the carriage member 73 and has a turned-down finger or detent 88 which may enter one or the other of the notches to lock the gear 74 against rotation. With the gear 74 thus locked, clockwise rotation of the screw shaft 76 causes the carriage structure to move forwardly as previously mentioned. The locking lever 86 is urged into locking position by a small spring 89 which is connected between the rearward end of the lever 86 and a portion of the carriage member 73. At its forward end, the lever 86 has a turned-up flange 90 which is adapted to engage a finger 91 on the stationary wall portion 78 when the movable carriage structure reaches the forward end of its travel. This causes clockwise movement of lever 86 as viewed in Fig. 3 about its pivot 87, causing the finger 88 to leave the recess of locking plate 83. Consequently, the gear 74 is unlocked, and the spring 82 abruptly returns the movable carriage structure to its starting position. During this return movement, both of the gears 74 and 75 are free to rotate and the finger 88 of locking lever 86 simply rides along the peripheral edge of the locking plate 83 between the recesses or notches. During this return movement the gear 74 rotates through approximately 180°, and at the end of the return movement the finger 88 engages the other notch of the locking plate 83.

To permit manual tuning, and also to enable pre-setting for push-button operation as hereinafter described, a manual tuning knob 92 is provided whose shaft 93 is rotatably supported by the front panel 63 and is connected through flexible coupling 94 to a collar 95*a* which is slidably supported by an extension 76*a* of shaft 76 and is movable by a yoke 96 engaging said collar. A clutch element 95 is secured to collar 95*a* and normally engages a second clutch element 97 which is mounted on the forward portion of the screw shaft 76. With the clutch elements engaged, rotation of the manual tuning knob 92 will effect rotation of the screw shaft 76 and thus effect tuning in the same manner as when the shaft is driven by the motor. As may be seen in Fig. 4, the yoke 96 is carried by a rod 98 which is slidably supported in apertured ears 99 and 100 extending from the fixed supporting frame. A coil spring 101 surrounds rod 98 between the supporting ear 99 and a collar or flange 102 fixed on the rod 98. The spring urges rod 98 rearwardly, or to the right, as viewed in Fig. 4, thereby normally maintaining the friction clutch elements 95 and 97 in engagement with one another.

Figure 4:
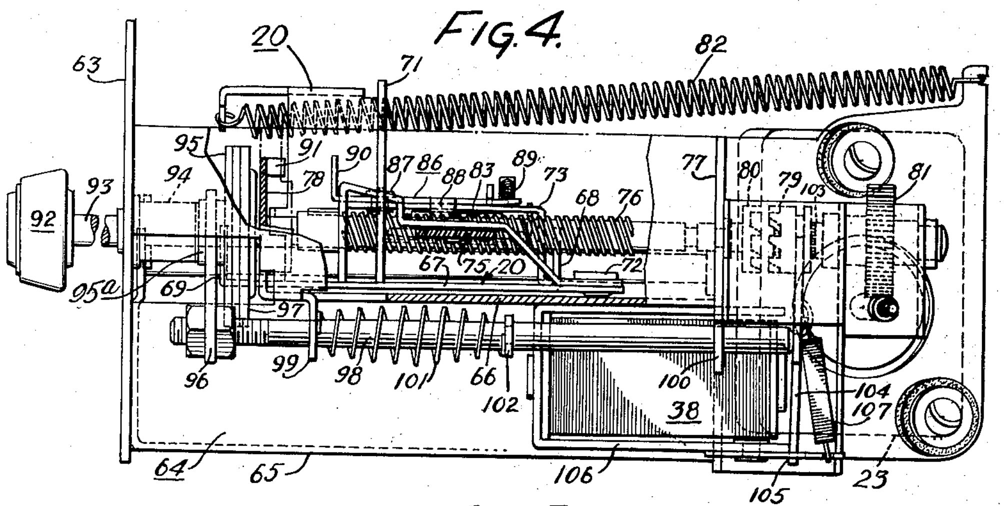
Fig. 4 is a side elevational view of the tuning mechanism taken from the right side thereof.
Figure 5:
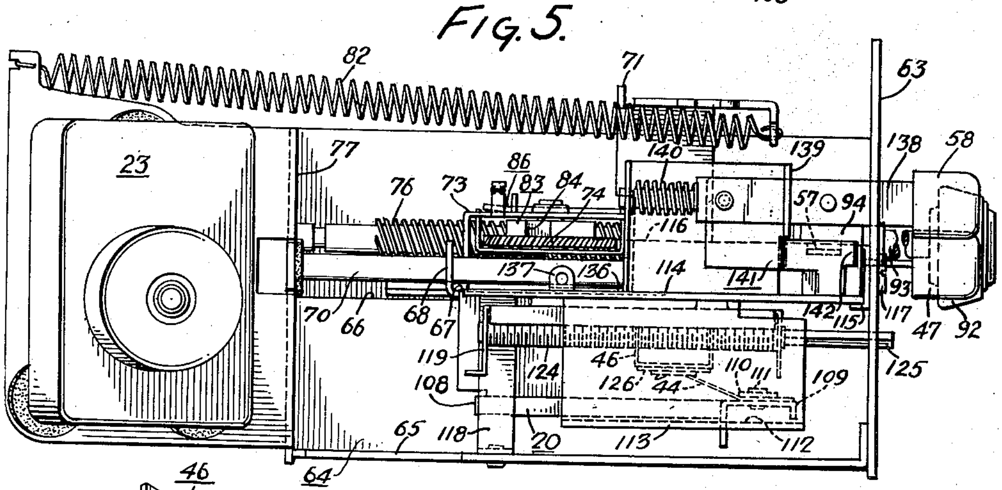
Fig. 5 is a similar view taken from the left side.

Referring still to Fig. 4, the solenoid 38, which was mentioned in the preceding description relative to Fig. 1, serves, when energized, to effect disengagement of the friction clutch elements 95 and 97 and to simultaneously effect engagement of the clutch elements 79 and 80 through which the driving motor is coupled to the screw shaft 76. Clutch element 80 is mounted on the rearward end of the screw shaft 76, while clutch element 79 is splined to the driven shaft 103 of the reduction gear unit 81. Clutch element 79 has an annular recess through which it is engaged by the bifurcated upper portion of armature 104 which has its lower and swivelly connected at 105 to the solenoid support 106. The spring-biased rod 98 engages armature 104 which also is provided with a biasing spring 107. The armature is thus normally maintained in such position that the clutch elements 79 and 80 are disengaged. When the solenoid 38 is energized, as previously described in connection with Fig. 1, armature 104 is actuated to effect engagement of clutch elements 79 and 80, and to simultaneously effect disengagement of the friction clutch elements 95 and 97 through movement of rod 98. The forward movement of the rod against the action of spring 101 causes movement of the front clutch element 95 away from the associated clutch element 97. Thus, when the solenoid 38 is energized, the screw shaft 76 is effectively de-coupled from the manual tuning knob 92 and is coupled to the driving motor 23. Deenergization of the solenoid causes the parts to return to the position shown so that the screw shaft 76 is again coupled to the tuning knob and is de-coupled from the driving motor.

Reference is now made to the switching mechanism which is located to the left of the above-described driving mechanism. As may be seen in Figs. 3, 6 and 9, the base member 67 of the movable carriage structure has an extending wing 108 which tapers to an arm 109 to which resilient contact fingers 44 are secured by a clamping plate 110 and rivets 111. It should be noted that the contact fingers 44 are the similarly designated switch elements shown in Fig. 1, all of which are grounded to the supporting frame through the metal parts of the carriage structure. The left-hand free end of the arm 109 is slidably supported by a flange 112 of a side plate 113. As may be seen in Figs. 2 and 5, plate 113 is secured to, and depends from, a horizontal shelf 114 which is formed of insulating material. As may be seen in Fig. 6, the shelf 114 is supported at its front on turned flanges or lugs 115 of a shell 116 which is secured to the front panel 63 by screws 117. At its rear, the shelf 114 is supported by a bracket 118 mounted on the stationary base plate 65. The arm 109, which carries the resilient contact fingers 44, moves in the space between the base plate 65 and the shelf 114.

Figures 3, 9, 10:
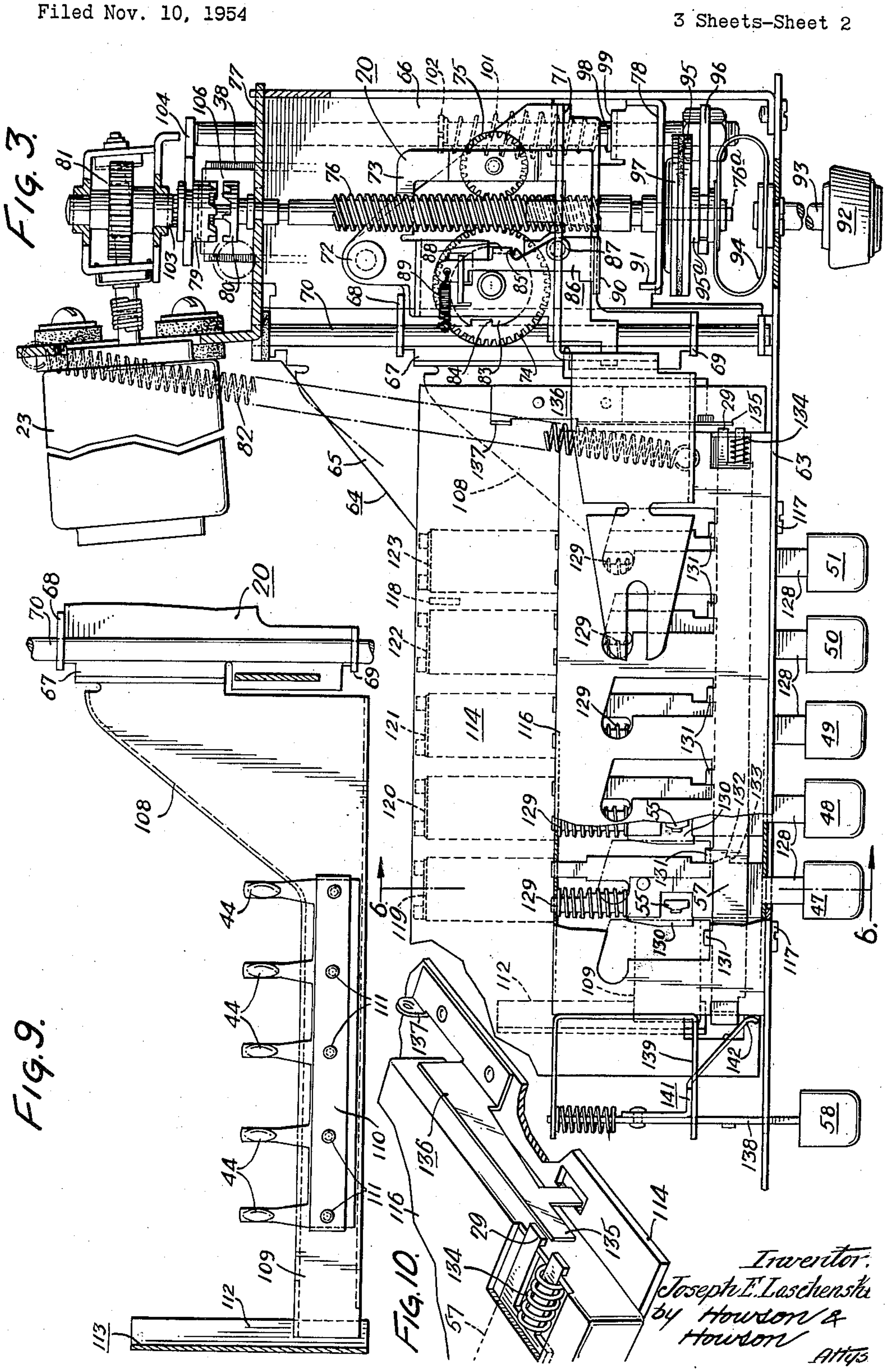
Fig. 3 is a plan view of the tuning mechanism.
Fig. 9 is a plan view of the member which cooperates with said elements to control the limited signal seeking.
Fig. 10 is a detail view showing the switch which initiates signal-seeking operation.
Figures 6, 7, 8:
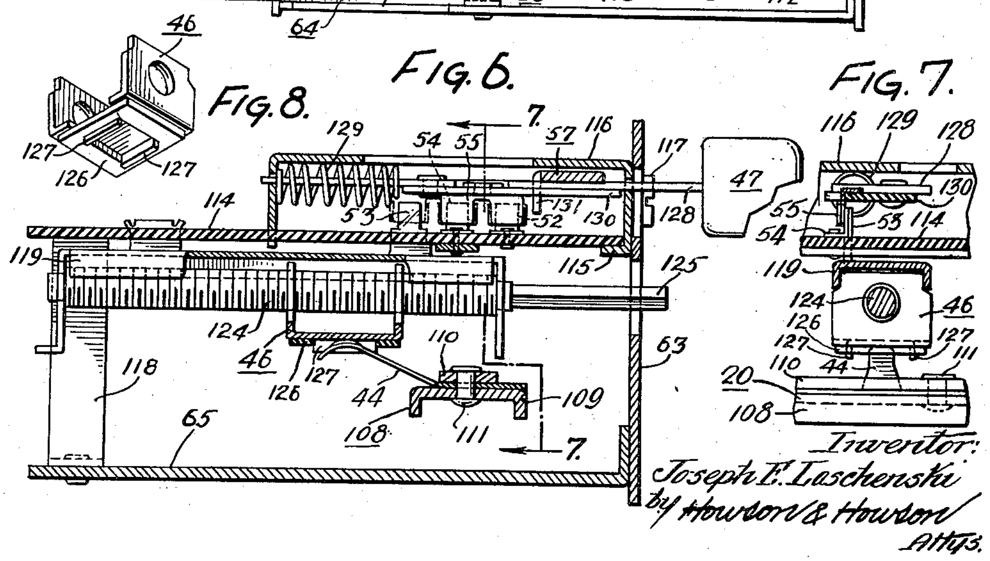
Fig. 6 is a sectional view taken on line 6—6 of Fig. 3.
Fig. 7 is a sectional view taken on line 7—7 of Fig. 6.
Fig. 8 is a perspective view of one of the elements which determine the selectable portions of the reception band for limited signal-seeking.

Secured to the underside of the insulating shelf 114 are a plurality of supporting brackets, there being five of these in the illustrated embodiment numbered 119 to 123 (see Fig. 3). As shown in Fig. 6, each of these brackets rotatably supports a screw 124 which has a forwardly projecting stem 125 that projects through an aperture in the front panel 63. Each of these screws supports and threadedly engages a U-shaped metallic element 46, it being noted that this is the similarly designated switch element mentioned in the preceding description in connection with Fig. 1. Each of the elements 46 is preset as hereinafter described by turning its supporting screw. Since the element 46 is prevented from turning by the side flanges of the associated bracket (see Fig. 7), turning the screw causes the element 46 to move along the screw. The central area of the bottom surface of each element 46 is framed by an insulating frame 126 (see Fig. 8) which is held against the bottom surface of element 46 by turned-down lugs 127 thereon. The framed portion of the bottom surface of the contact element 46 is adapted to be engaged by one of the resilient contact fingers 44 whose free end portion wipes over said area between the retaining lugs 127 during signal-seeking action.

As may be seen in Fig. 6, each of the screw-supporting brackets 119 to 123 has an upwardly-extending contact finger 53, which corresponds to the similarly designated contact in Fig. 1 and is an element of each push-button switch. Thus this finger is electrically connected to contact element 46 through the screw and the associated bracket. This finger 53 projects upwardly through an aperture in the insulating shelf 114 so that it is within the enclosure defined by the shelf 114 and the previously mentioned shell 116. The latter also contains the other elements of the push-button switches 47 to 51. As shown in Fig. 6, each of these switches comprises a slide bar 128 which is urged forwardly by a spring 129. Each slide bar has a cut away portion and carries an insulating plate 130 (see also Figs. 3 and 7) on which contact element 55 is mounted, the latter being the similarly designated contact of Fig. 1. This contact is a bridging contact which normally engages the front and intermediate contacts 52 and 54 which are mounted on the insulating shelf 114. The electrical connections to the latter contacts are as shown in Fig. 1. Normally, the bridging contact 55 engages contacts 52 and 54, but when the slide bar 128 is actuated, the bridging contact 55 leaves contact 52 and engages the back contact 53 so that it then bridges the contacts 53 and 54.

As previously described in connection with Fig. 1, the contact elements 46, in cooperation with contact fingers 44, serve to define portions of the signal reception range or band for limited signal-seeking tuning. Each of the contact elements 46 may be preset for selection of a particular broadcasting station as follows. With all of the push-buttons in their outer position (Fig. 1) the receiver is tuned manually until the desired station is received. Then the receiver is turned off by operation of the on-off switch (not shown), and the selected one of the push-button switches 47 to 51 is actuated. This opens the normal ground connection of conductor 56 and connects that conductor to the contact element 46 associated with the actuated push-button switch. The receiver is then turned on again, and unless the contact element 46 happens to be in the proper position (in which case no adjustment would be necessary), the receiver will be silenced. Finally the screw 124 of the particular contact element 46 is turned until the signal is again heard. This occurs when the contact element 46 is in such position that it is engaged by the associated contact finger 44, as the conductor 56 is then connected to ground. The foregoing procedure is repeated to set each of the other contact elements 46.

Referring to Figs. 3 and 6, the latch bar 57, previously referred to in the description relative to Fig. 1, is cooperatively associated with the slide bars 128. This latch bar has spaced depending fingers 131 through which it is actuated toward the right, as viewed in Fig. 3, by a cam portion 132 provided on each of the slide bars. The movement of the latch bar is only momentary, and the finger 131 moves behind the shoulder 133 under the force of return spring 134. Thus, it will be seen that depression of any one of the slide bars 128 causes that slide bar to be latched in its actuated position and causes release of any previously actuated slide bar.

As mentioned previously in connection with Fig. 1, the starting switch 29 is momentarily closed by the momentary movement of the latch bar. As may be seen in Figs. 3 and 10, the switch 29 comprises a spring finger 135 extending from mounting plate 136 having a connection terminal 137. When the end of the latch bar 57 engages the finger 135, the latter is momentarily grounded through the metal parts of the mechanism.

As also previously mentioned in connection with Fig. 1, the starting switch 29 may be closed by actuation of manual element 58. As shown in Fig. 3, this element comprises a slide bar 138 which is slidably supported by a U-shaped bracket 139 secured to one end of shell 116. A coil spring 140 engages one arm of the bracket 139 and a shoulder on the slide bar, and serves to urge the slide bar forwardly. The slide bar carries an insulating element 141 which limits the forward movement of the slide bar by engagement with the bracket 139, and which has a finger 142 adapted to engage the associated end of the latch bar 57. Thus depression of the element 58 effects closure of switch 29 through actuation of the slide bar.

The complete operation of the receiver may now be more clearly understood. Assuming that the elements 46 have been adjusted as previously described for push-button selection of stations to which the user customarily listens, the receiver may be operated either to effect over-all signal-seeking tuning or to effect selective limited signal-seeking. If it is desired to effect over-all signal-seeking tuning, all of the push-button switches 47 to 51 are left in their normal unactuated positions, and the element 58 is momentarily depressed to initiate operation of the tuning means through closure of switch 29. It should be noted that if any of the push-button switches is in actuated position, the movement of the latch bar will release such switch. The tuning mechanism then operates as previously described until a received signal terminates the operation. Successive operations of element 58 will cause successive signal-seeking tuning operations, and when the tuning mechanism reaches the end of its operating range, it will return to its starting position and again proceed forwardly.

When it is desired to select a station represented by one of the push-buttons 47 to 51, the appropriate push-button is depressed to initiate tuning operation through closure of switch 29 and to condition the circuits for limited signal-seeking tuning as described in connection with Fig. 1. The actuated push-button switch remains in actuated position until one of the other push-buttons is depressed. The tuning mechanism will operate until it is stopped by a received signal within the limited signal-seeking range.

From the foregoing description, it will be seen that the invention provides a novel tuning arrangement for a signal receiver by which either over-all or limited signal-seeking tuning may be effected. Moreover, it should be noted that with this arrangement, it is unnecessary to make highly accurate adjustments with respect to preselected stations which are to be selected by the station-selecting push-buttons. The signal-seeking action within the selected range effects accurate tuning of the receiver to the desired station and eliminates the need for extremely accurate adjustment. Furthermore the presetting adjustment is simple and can easily be performed by the user. It should be noted also that station-selection switches are independent units.

As previously mentioned, the invention is principally characterized in that stoppage of signal-seeking tuning is made to depend, not only upon the reception of a signal, but also upon the conditioning of circuit means under control of pairs of switches, one switch of each pair being actuated by the tuning means, and the other switch of each pair serving to render the first switch effective or ineffective. In the illustrated system, the cathode-to-ground circuit of at least one of the high frequency stages of the receiver is made to serve as the circuit means to be controlled by said switches. However, the switches may be used to control any circuit which must be conditioned in a particular manner to enable stoppage of the tuning operation in response to a received signal. For example, the switches could be arranged to control one of the circuit connections 34 and 35.

Furthermore, any electrical arrangement of the pairs of switches may be employed which will accomplish the purpose of the invention. For example, the switches could be used to control a circuit that must be opened to enable stoppage of the tuning operation, in which case the switches of each pair could be connected in shunt with one another and both normally closed, and the shunt-connected pairs could be serially connected in the circuit to be opened.

While a preferred embodiment of the invention has been illustrated and described, the invention is not limited thereto but contemplates such modifications and further embodiments as may occur to those skilled in the art.

I claim:

1. In a signal-seeking receiver, means for varying the tuning of said receiver to tune in signals having frequencies within a predetermined frequency range, means for stopping said tuning means upon the tuning in of a signal, a circuit which must be closed to permit operation of said stopping means, at least one manually-operable switch comprising contacts which are closed when the switch is not actuated and through which said circuit is normally closed, and said switch also comprising contacts which are open when the switch is not actuated, said switch having a single actuating mechanism for opening the first-named contacts and for closing the last-named contacts, and at least one other switch connectable in said circuit through said last-named contacts and operable by said tuning means to be closed during tuning through a portion of said frequency range, whereby when said first switch is not actuated said stopping means is operable throughout said frequency range, and when said first switch is actuated said stopping means is operable only in said portion of said frequency range.

2. A signal seeking receiver according to claim 1, wherein said other switch comprises a contact movable by said tuning means and a stationary contact engageable by said movable contact and adjustable to different positions within the range of movement of said movable contact.

3. A tuning apparatus having a carriage mounted for movement in a linear path between two limiting positions, an adjustable tuning element connected to said carriage for movement therewith, an electric motor, an electrical circuit controlling said motor, means including said motor for actuating said carriage through energization of said motor control circuit, and means through which an incoming signal of sufficient strength within the range of said tuning element is applied to said motor control circuit to stop said motor, said latter means including a plurality of contact fingers carried by said carriage and movable therewith in spaced apart parallel paths, and including a switching unit for each of said fingers including a current conductor with which said contact fingers on the carriage have engagement over a predetermined small portion of the distance of travel of the carriage, each of said current conductors have mounting on a screw threaded shaft having its axis in alignment with the line of motion of its cooperating contact finger on the carriage so as to occupy selected positions of adjustment throughout the range of travel of the cooperating contact finger on the carriage.

4. In a signal-seeking receiver, power-actuated means for varying the tuning of said receiver to tune in signals having frequencies within a predetermined frequency range, means for stopping said first means upon the tuning in of a signal, a plurality of push-button switches, a latch bar for retaining any one of said switches in actuated position, a starting switch operable by said latch bar to initiate operation of said tuning means, a push-button member for actuating said latch bar to actuate said starting switch independently of the first-named switches, a plurality of normally-ineffective switches rendered effective respectively by actuation of the first-named switches and operable by said tuning means in tuning through different portions of said frequency range, and circuit means controlled by said first- and last-named switches for rendering said stopping means operable throughout said frequency range when none of the first-named switches is actuated and for rendering said stopping means operable only in a portion of said range when one of the first-named switches is actuated to render one of the last-named switches effective, wherein said push-button switches comprise serially-connected normally-closed contacts through which said circuit means is normally closed, and normally-open contacts through which said circuit means is connected to one of the normally-ineffective switches when one of the push-button switches is actuated.

5. A tuning apparatus having a carriage mounted for movement in a linear path between two limiting positions, an adjustable tuning element connected to said carriage for movement therewith, power means for actuating said carriage, means for stopping the actuation of said carriage, and means for controlling the operation of said stopping means, said latter means including a plurality of contact fingers carried by said carriage and movable therewith in spaced apart parallel paths, and including a switching unit for each of said fingers including a current conductor with which said contact fingers on the carriage have engagement over a predetermined small portion of the distance of travel of the carriage, each of said current conductors having mounting on a screw threaded shaft having its axis in alignment with the line of motion of its cooperating contact finger on the carriage so as to occupy selected positions of adjustment throughout the range of travel of the cooperating contact finger on the carriage.

6. In a signal-seeking receiver, power-actuated means for varying the tuning of said receiver to tune in signals having frequencies within a predetermined frequency range, means for initiating operation of said first means, means for stopping said first means upon the tuning in of a signal, a plurality of manually-operable switches, a plurality of normally-ineffective switches rendered effective respectively by actuation of the first-named switches and operable by said tuning means in tuning through different portions of said frequency range, and circuit means controlled by said first- and last-named switches for rendering said stopping means operable throughout said frequency range when none of the first-named switches is actuated and for rendering said stopping means operable only in a portion of said range when one of the first-named switches is actuated to render one of the last-named switches effective, wherein said first-named switches comprise serially-connected normally-closed contacts through which said circuit means is normally closed, and normally-open contacts through which said circuit means is connected to one of the normally-ineffective switches when one of the manually-operable switches is actuated.

7. A signal-seeking receiver according to claim 6, wherein said circuit means comprises a cathode-to-ground circuit of the receiver.

8. A signal-seeking receiver according to claim 6, wherein each of said normally-ineffective switches comprises a contact movable by the tuning means and a preset stationary contact engageable by said movable contact.

9. A signal-seeking receiver according to claim 8, wherein the preset contact of each of said normally-ineffective switches is mounted on a rotatable adjustment screw and moves therealong upon rotation of the screw.

10. A signal-seeking receiver according to claim 6, further including a variable impedance in series with said normally-closed contacts to enable adjustment of the sensitivity of said receiver when none of the first-named switches is actuated and said stopping means is operable throughout said frequency range.

References Cited in the file of this patent

UNITED STATES PATENTS

| | | |
|---|---|---|
| 1,913,617 | Smith | June 13, 1933 |
| 2,052,708 | Hammond | Sept. 1, 1936 |
| 2,394,869 | Nicholson | Feb. 12, 1946 |
| 2,499,967 | Nicholson | Mar. 7, 1950 |
| 2,501,003 | Pifer | Mar. 21, 1950 |
| 2,544,535 | Kennedy | Mar. 6, 1951 |
| 2,572,926 | Gull | Oct. 30, 1951 |
| 2,577,955 | Dixon | Dec. 11, 1951 |
| 2,744,193 | Schwarz | May 1, 1956 |